No. 661,898. Patented Nov. 13, 1900.
J. F. TUCKER.
PROCESS OF AND APPARATUS FOR PROTECTING TREES OR VEGETATION AGAINST COLD.
(Application filed May 29, 1899.)
(No Model.)
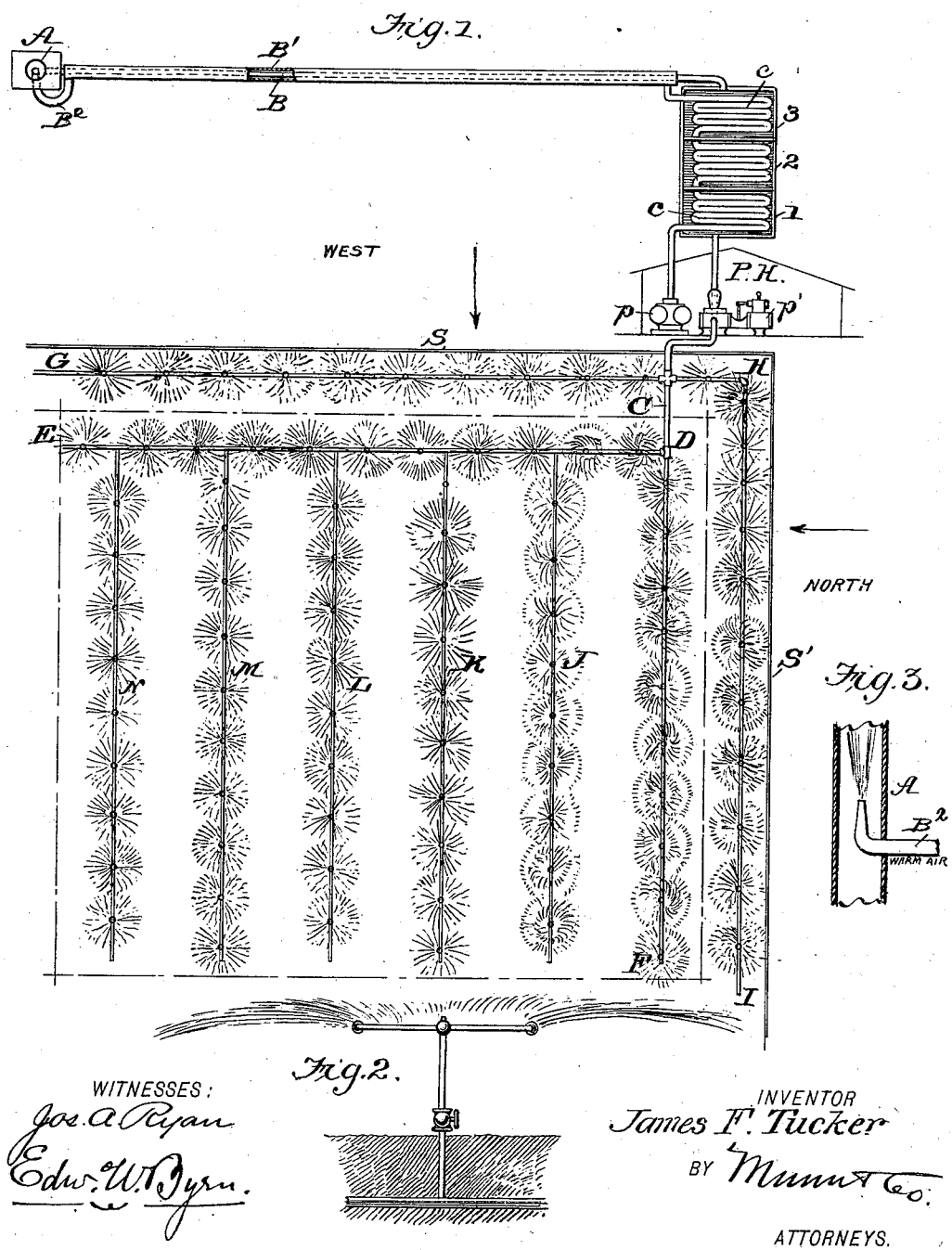
WITNESSES:
Jos. A. Ryan
Edw. W. Byrn.
INVENTOR
James F. Tucker
BY Munn & Co.
ATTORNEYS.

UNITED STATES PATENT OFFICE.

JAMES F. TUCKER, OF BROOKSVILLE, FLORIDA.

PROCESS OF AND APPARATUS FOR PROTECTING TREES OR VEGETATION AGAINST COLD.

SPECIFICATION forming part of Letters Patent No. 661,898, dated November 13, 1900.

Application filed May 29, 1899. Serial No. 718,672. (No model.)

*To all whom it may concern:*

Be it known that I, JAMES F. TUCKER, of Brooksville, in the county of Hernando and State of Florida, have invented a new and useful Improvement in Apparatus for Protecting Trees or Vegetation Against Cold, of which the following is a specification.

My invention is in the nature of a novel apparatus for the protection of orange groves, pineapple plantations, vegetable farms, peach orchards, berry patches, and other tender vegetation from injury by frost or freezing.

I have learned by observation and experience that tender vegetation on the south shore of a river, lake, or other body of water usually escaped the blighting effect of frost, while similar vegetation on the north side had been badly hurt and often killed. The orange groves in Florida which have enjoyed the greatest immunity from frost have been in nearly every case protected by a body of water to the north or west of them or, better still, both north and west, the directions from which the severest cold in Florida usually comes. In Florida the deep water, rivers, and lakes are commonly fed by springs, which contribute to the heat treasured up from the long summer months, so that when a cold spell comes the air is brought in contact with a body of water at a relatively high temperature—say 66° to 70°. This contact of the cold, frosty, or freezing atmosphere with this body of warm water causes a cloud of fog or vapor, sometimes quite dense, to rise from the surface of the lake or river and completely envelop the locality south and east of it, thus securing immunity to orange groves or vegetable gardens that may happen to be there, and groves are so located with the specific purpose of securing the protection assured by such conditions. This vapor by condensation makes sensible the latent heat, supplying the favored locality with both heat and moisture and raising the temperature to such a degree as to give more or less immunity from damage by frost or freezing. In Bulletin No. 23, W. B. 186, of the United States Weather Bureau, published by the United States Agricultural Department, it is stated that "The heat given off by the condensation of vapor is enormous. The condensation of enough vapor to make one pint of water will evolve enough heat to raise more than five pints of water from the freezing to the boiling point."

My invention proceeds upon these principles, and it comprises means for making an artificial fog in the orchard or over the ground to be protected, in which means as leading elements I employ one or more Artesian wells for supplying water, pipes distributing the water throughout the orchard, heating appliances for warming the water, pumps for forcing it to its destination, compressed-air appliances, and numerous spray-nozzles distributed throughout the orchard for spraying the warmed water and converting it into a protecting blanket of vapor, in connection with other details hereinafter more fully described.

My essentials are heat and moisture applied in such a way as to make sensible the latent heat as an adjunct to the heat I actually apply. For water I look, preferably, to Artesian wells, as they are usually of a high degree of temperature and remain unchanged by the cold of winter. In the absence of wells I seek the warmest water I can find in the deepest parts of rivers, lakes, &c. In Florida I have found Artesian and other deep wells to range from 72° to 84° and I think can reckon on 65° to 70° for the deep water of rivers and lakes, my object being in all cases to obtain the water naturally warmest. My experiments have been made with the natural water alone, and I believe that where the temperature of the well runs high it will, for anything but the severest weather, be found sufficient; but in order to make my system a protection against any cold that may come to the fruit-belt I utilize the intense heat of compressed air, by means of which I believe I can raise the temperature of these already-warm waters to 100° or 110° or more.

My plan in its perfection contemplates the use of the compressed-air pump whether needed as a water-lift or not.

Figure 1 is a plan view of a plant for carrying out my invention; Fig. 2, a detail of one of the spray-nozzles, and Fig. 3 is a detail of the lifting-ejector.

A is an Artesian or deep well source of water-supply.

B and B' are concentric pipes (four inches, inside of six inches) forming a hollow space between for compressed hot air which heats the water as it passes through the inner four-inch pipe from well A to cistern 3.

1 2 3 are covered cisterns, each with its coil of pipe through which the hot air from a compressing-engine passes before being discharged into the annular space of double pipe B B' and thence down the well, where it acts as an air-lift, and P H pump-house, with pump $p$ for compressed air and pump $p'$ for pumping water.

C is a four-inch main connecting with water-pump $p'$.

D to E is a three-inch pipe or feeder-main with inner series of spray-nozzles.

G to H and H to I are one-and-one-half-inch pipes with outer series of spray-nozzles.

D to F is a one-and-one-half-inch pipe with inner series of spray-nozzles.

J, K, L, M, and N are one-and-one-fourth-inch pipes with interior spray-nozzles.

S and S' are high board fences, which may be used on the windward side of the grove to break the force of the wind and hold the vapor from being blown away when the wind is too high.

The operation of the apparatus is as follows: The air-compressing pump $p$ discharges its hot air into the coils $c$ of the several tanks 1 2 3 and thence into the annular space between pipes B and B′, and thence at the well passes into an ejector-pipe $B^2$, Fig. 3, that helps to lift the water out of the Artesian well. The water from the well flowing through inner pipe B is warmed by the surrounding body of heated air and is also further heated by hot air in coils $c$, where it surrounds them in the cisterns. After cistern 3 is filled the water, by overflow or water gates, passes into cistern 2, where a still higher temperature is attained. Cistern 2 being filled by overflow or water gate, water passes into cistern 1, where the fresh hot air passing from the compressor through the coil gives a still higher degree of heat. From cistern 1 the hot water is taken by the steam pumping-engine $p'$ and forced through the mains and out of the spray-nozzles at any degree of pressure required, thus securing a thorough impregnation of the atmosphere over the ground to be protected with a dense and warm mist. The pipes running through the orchard are from one to two feet underground, and connections therefrom with suitable valves rise at intervals and connect with spray-nozzles, as shown in Fig. 2. Suitable valves also control the several mains. For ordinary purposes the two outer guard-lines may be sufficient, since nearly all Florida cold spells are accompanied by winds of considerable velocity and these winds will sweep the vapor through the grove as it does the mist or fog that rises from a body of water to north or west of a grove, and I may even without heating the water bathe the grove in a hotter and moister atmosphere than is done by a lake or river. My purpose in having three cisterns, which are to be housed and tightly covered, so as to treasure up the heat, is that I may be able to hold the water there from one to three hours with the air-pump working at full capacity in order to be sure of a sufficient heat to overcome the severest cold that may ever come to the orange section, thus making the grower perfectly secure. In all cases I would advise instead of one engine two small ones representing the same capacity, the duplicate system being a protection against accident to machinery at a time when it might prove fatal. The sprays would be adjustable, so as to open a larger orifice and be used for irrigation when desired, and cistern 1 can be used for the preparation of the emulsion for treating the trees for scale and other insect enemies. When the hot compressed air issues from the ejector in the Artesian well, it mingles with and is carried along by the water in its travel to the spray-nozzles. This not only insures the utilization of all the units of heat in this air, but it also when issuing at the spray-nozzles along with the water forms an atomizing-blast that produces a fine comminution of the water and produces the physical characteristics of a fog. That this may be understood more clearly I would state I am aware that a system of underground pipes with ordinary spray-nozzles have heretofore been used for irrigating purposes, but in such case the water issues in solid streams for watering purposes only. This has the desired effect on the ground, but practically none upon the air, which is the factor treated in my case. In my invention the admixture of air with the water, and especially heated air, causes the water to be atomized or comminuted to an extreme degree, which partakes of the nature of a fog or mist which hangs in the air with the physical results described and with which my wind-break fences are especially correlated, as the tenuous character of the mist produced renders it more liable to be dissipated by wind. With the powerful agency of pumps and wind-breaks which I employ I am enabled to project a warm fog into the atmosphere and to preserve this condition during the danger period against ordinary winds long enough to protect the trees or vegetation.

Having thus described my invention, what I claim as new, and desire to secure by Letters Patent, is—

1. An apparatus for protecting trees and vegetation from cold, comprising a system of pipes extending at close intervals through the field and provided with spray-nozzles distributed along the same, a source of water-supply connected thereto, and means for forcing a mixture of air and water to the nozzles and energizing its issue in an atomized mist or fog throughout the protected area, substantially as and for the purpose described.

2. An apparatus for protecting trees and vegetation from cold, comprising a source of water-supply, means for heating it, pipes for transferring the artificially-heated water to the fields, means for energizing the passage of water through the same, said pipes being extended at close intervals through the field and made of gradually-decreasing diameter as they extend to a more remote point from the supply, and spray-nozzles connected with the system of pipes and distributed at close intervals over the entire field to produce a protecting blanket of mist over the field and injecting into the atmosphere heat and moisture substantially as and for the purpose described.

3. An apparatus for protecting trees and vegetation from cold, comprising a system of pipes, two series of said pipes being to the north and west of and extending at close intervals through the field and provided with spray-nozzles distributed along the same, a source of water-supply connected thereto, means for heating it, a means for transferring the artificially-heated water to the nozzles and energizing its issue in the form of a mist throughout the protected area, and a wind break or shield which in combination with the two series of sprays to north and west hold the mist over said area substantially as described.

4. An apparatus for protecting trees and vegetation from cold comprising a system of pipes extending at close intervals through the field and provided with spray-nozzles distributed along the same, a source of water-supply connected thereto, means for heating the water, and means for introducing air and forcing it through the nozzles to atomize the water and form an enveloping blanket of mist throughout the field substantially as described.

5. An apparatus for protecting trees and vegetation from cold, comprising a system of pipes with spray-nozzles extending at close intervals and distributed throughout the entire field, a source of water-supply, pumps for energizing the water and an air-compressor discharging its air in heated condition directly into the water, for the triple purpose of promoting the flow of the water, for heating the same, and for admixing a gaseous medium therewith to promote its atomization at the discharge-nozzles substantially as set forth.

6. An apparatus for protecting trees and vegetation from cold, comprising a well or source of supply having an issue-pipe with an ejector-nozzle within the same, two concentric pipes one connected with the water-pipe from the well and the other with the ejector-pipe, a pump drawing water from one of the concentric pipes, and an air-compressor forcing hot air through the other concentric pipe in reverse direction to the water flow and connecting with the ejector-nozzle and a system of pipes with spray-nozzles connecting with the water-supply and extending at close intervals throughout the field substantially as and for the purpose described.

7. An apparatus for protecting trees and vegetation from cold, consisting of a source of water-supply two pipes arranged one within the other, a cistern with heating-coils communicating with the annular space between the two pipes, an air-compressor communicating with the coils and annular space between the pipes, a water-forcing pump, and a series of distributing-pipes and spray-nozzles extending at close intervals throughout the field substantially as and for the purpose described.

JAMES F. TUCKER.

Witnesses:
CHARLES A. MAXWELL,
PHILIP S. NORTH.